United States Patent
Wiiki et al.

[11] 3,888,321
[45] June 10, 1975

[54] ELECTRONIC BALANCE

[75] Inventors: Leroy E. Wiiki, St. Joseph; George J. Sitek, Stevensville, both of Mich.

[73] Assignee: Leco Corporation, St. Joseph, Mich.

[22] Filed: Feb. 16, 1973

[21] Appl. No.: 333,049

[52] U.S. Cl. .............................. 177/165; 177/210
[51] Int. Cl. ...................... G01g 23/14; G01g 3/14
[58] Field of Search .......... 177/1, 165, 210, DIG. 3

[56] References Cited
UNITED STATES PATENTS

| | | | |
|---|---|---|---|
| 2,974,863 | 3/1961 | Williams, Jr. et al. | 177/165 X |
| 3,077,940 | 2/1963 | Blodgett et al. | 177/165 |
| 3,684,875 | 8/1972 | Smith et al. | 177/165 UX |
| 3,709,309 | 1/1973 | Williams, Jr. et al. | 177/165 |
| 3,731,754 | 5/1973 | Godwin et al. | 177/165 |

Primary Examiner—George H. Miller, Jr.
Attorney, Agent, or Firm—Price, Heneveld, Huizenga & Cooper

[57] ABSTRACT

An electronic balance includes circuit means for providing a plurality of electrical pulses representing the weight of an object positioned on the balance. Storage and comparator means are provided to selectively store tare weight representative signals and to control the application of the electrical pulses to a display circuit such that only the pulses corresponding to a weight exceeding the stored tare weight are applied to the display. The system, therefore, can automatically compensate for an unknown tare weight of a sample holder by storing the weight of the sample holder and provide a read-out of only the weight of the sample then positioned in the sample holder.

5 Claims, 6 Drawing Figures

PATENTED JUN 10 1975

SHEET 1

3,888,321

ELECTRONIC BALANCE

BACKGROUND OF THE INVENTION

The present invention relates to electronic balances and particularly to an improved balance for automatically compensating for an unknown tare weight.

In conventional electronic balances, typically a sample holder or other object having a known tare weight is employed with the balance and the tare weight is programmed into the balance manually by adjusting a tare weight potentiometer or other means within the circuitry of the device to compensate for the known tare weight. In such systems, it is necessary, therefore, to either program the known tare weight into the balance or to balance out the tare weight either mechanically or electrically before the actual weight of the sample positioned in the sample holding member can be read. U.S. Pat. Nos. RE 26,100 reissued Oct. 11, 1966 to L. Cahn and 3,519,095 issued July 7, 1970 to S. R. Tomes are representative of such systems.

Although such systems perform adequately for some applications, the use of such balances can become somewhat burdensome when several weighings are made since each sample holder will have a different weight. Also, the weight of a given sample holder will vary somewhat over a period of use.

In some electronic balances which count weight representative pulses applied directly to a display circuit during a sampling interval, the accuracy of the read-out can be adversely affected due to inherent instabilities of the system which can cause the number of pusles provided over successive sample intervals to vary.

SUMMARY OF THE INVENTION

These and other disadvantages of previous electronic balances have been overcome by the balance of the present invention which applies pulses to a display circuit which represents an accumulation of pulses over several cycles of sampling to provide an accurate output display of the sample weight. Tare weight is automatically compensated for by means of a memory circuit which is selectively actuated to store the unknown weight of a sample holder and apply only pulses representing the weight in excess of the sample holder weight to a display circuit. In addition, the electronic balance of the present invention provides automatic blanking of the display when the weight of an object is less than the preceding stored weight.

Balances embodying the present invention include means for generating signals having a characteristic representing the weight of an object positioned on the balance. Means are provided for storing the weight of an object and for controlling the coupling of weight representative signals to display means such that only signals representative of a weight in excess of the stored weight is applied to the display.

Other advantages and features of the present invention will become apparent upon reading the following description thereof together with the accompanying drawings in which:

DETAILED DESCRIPTION OF THE PREFERRED EMBODIMENT

Figure 1:
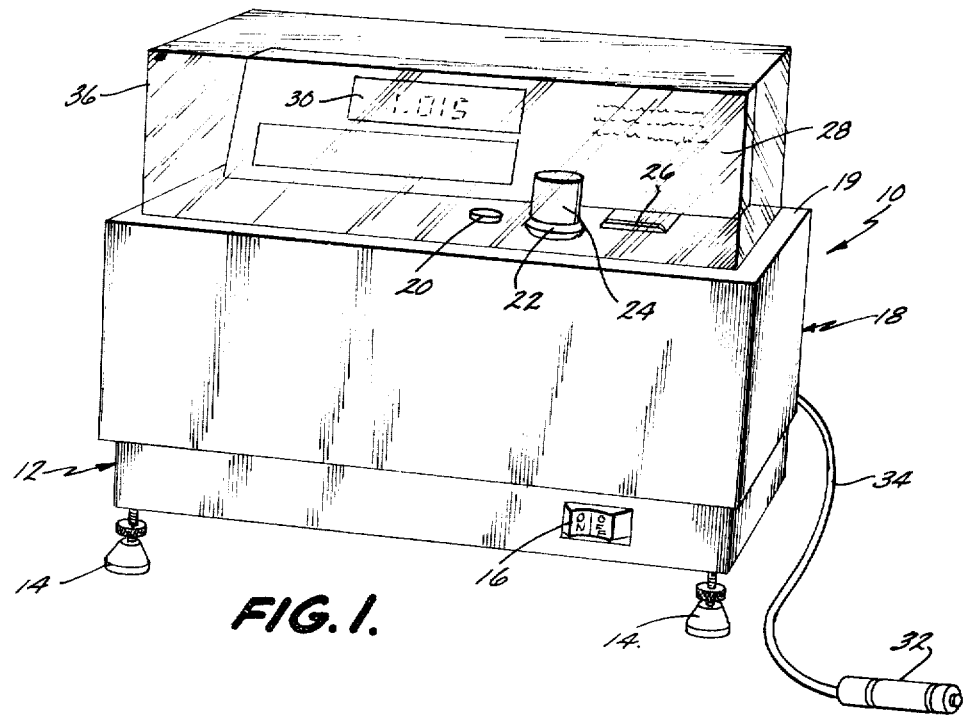
FIG. 1 is a perspective view of an electronic balance embodying the present invention.

Referring now to FIG. 1, there is shown an electronic balance 10 which includes a base 12 having adjustable support legs 14. An on-off electrical switch 16 is mounted at the front of the base. A housing 18 extends upwardly from base 12 and includes a platform 19 on the top thereof. A bubble level 20 is mounted on the platform to permit the balance to be leveled by adjusting legs 14. In addition, the balance includes a sample holding pan 22 on which rests a sample holding crucible 24.

Formed in platform 19 is a weight holding compartment 26 for storing calibration weights used for calibrating the balance periodically. The balance includes a read-out panel 28 positioned rearwardly on and extending upwardly from platform 19. Panel 28 includes a digital display panel 30. A tare switch 32 is electrically coupled to the balance by means of an interconnecting cable 34. A dust cover 36 is pivotally mounted to the rear of platform 19 such that it can be movably positioned over the platform as shown or lifted to permit access to the balance pan and crucible.

The balance is completely automatic in operation and once turned on by means of switch 16, the crucible 24 is positioned on the balance pan and the tare switch 32 is actuated to store the tare weight of the crucible which automatically rezeros the display output such that once a sample is positioned within the crucible, only the net or sample weight is displayed. A brief description of the circuitry of the balance is now presented followed by a detailed description of individual circuits and their operation.

Figure 2:
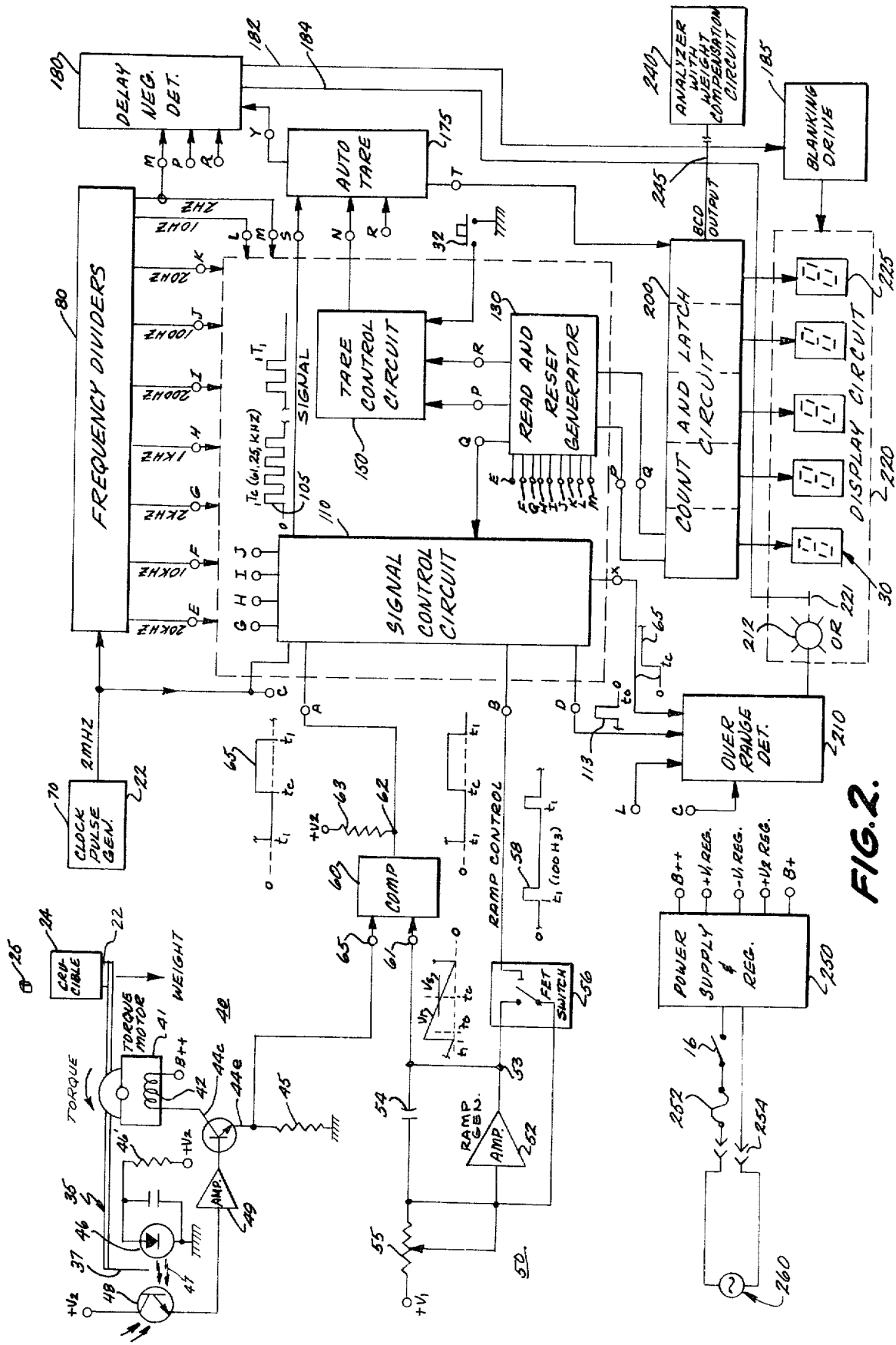
FIG. 2 is an electrical circuit diagram partly in schematic and block form showing the circuitry employed in a preferred embodiment of the electronic balance and includes waveform diagrams of signals at various circuit locations.

In FIG. 2 it is seen that the balance comprises electromechanical means 40 for providing signals representative of the weight of an object placed on the balance pan 22. A ramp generator 50 is selectively controlled at a sampling frequency (100 Hz) to provide a ramp voltage compared with signals from means 40 by a comparator circuit 60. Circuit 60 provides a pulse width modulated repetitive output signal 65 at terminal A. Signals 65 have a pulse width directly and linearly related to the gross weight of an object or objects positioned on balance pan 22 and are a first frequency corresponding to the 100 Hz sampling frequency.

The balance further includes a crystal controlled clock pulse generator 70 which applies second frequency signals (2 MHz) to a frequency divider circuit 80 which provides various submultiple frequency timing pulses at output terminals E-M as seen in FIG. 2. These timing signals are applied to a logic and control circuit 100 as well as various other circuits described below. The logic and control circuit 100 includes a signal control circuit 110 which accumulates a number of clock pulses over several sampling intervals and provides third frequency output signals 105 representative of the weight of an object positioned on the balance. A read and reset generator provides read and reset pulses to define a display interval encompassing several sample intervals. These pulses are applied to various circuits as described below.

A tare control circuit 150 is included in the logic and control circuit 100 and receives signals from tare switch 32 to generate a signal during a display interval which actuates a storage circuit in the auto-tare circuit 175. Circuit 175 includes selectively operated coupling means for applying the weight representative signals to a count and latch circuit forming a portion of the display means only when the weight of an object exceeds the weight information stored in the storage means. Circuit 175 is also coupled to a delay negative detector 180.

The count and latch circuit is coupled to the read and reset generator and to the display circuit 220 including the digital display 30. Circuit 200 includes a BCD output which can be coupled to a remotely located analyzer 240 including an automatic weight compensation circuit as described below. In addition, the balance includes a blanking drive circuit 185 coupled between the delay negative detector 180 for blanking the display 30 under certain conditions described below.

The balance further includes an over range detector 210 coupled to the logic and control circuit and to the frequency divider circuit for actuating an over range light 212 in the event a specimen out of the measuring range of the balance is placed on the sample pan 22.

Power for the various circuits is provided by a power supply circuit 250 which is coupled to a source 260 of alternating current by means of the power on-off switch 16, fuse 252 and suitable plug means 254 shown schematically in the figure. The power supply 250 provides $+V_1$ and $-V_1$ regulated voltages, a $+V_2$ regulated voltage and B+ and B++ unregulated voltages for the various circuits. It is understood that each of the electrical circuits of the balance are suitably coupled to the power supply, only some of the specific interconnections to the supply being shown in the figures. It is noted here that similarly identified terminals are electrically interconnected by suitable conductors (not shown). A description of the operation of the balance is now presented together with a detailed description of the various circuits involved.

Referring now in detail to circuit 40 in FIG. 2, it is seen that the balance includes a balance beam 35 which supports the sample pan 22 at one end and includes a light interrupting member 37 at the opposite end. Intermediate the opposite ends, balance beam 35 is coupled to the armature 39 of a torque motor 41 having a field winding 42 coupled at one end to the B++ supply and at the other end to the collector terminal 44C of transistor 44. An electro-optical feedback path is provided by means of a light emitting diode 46 coupled to the $+V_2$ supply by means of resistor 46' and having the remaining terminal returned to ground. Light rays 47 from light emitting diode 46 impinges upon a photosensitive surface of a phototransistor 48 coupled between the $+V_2$ supply and amplifier 49. The output of amplifier in turn is coupled to base terminal 44B of transistor 44 thereby completing the feedback loop. It is noted here that amplifier 49 includes conventional biasing means for the transistor 44 (not shown).

The loop gain is selected for critical damping of the balance beam 35 which is normally held in a reference position such that the member 37 intercepts a predetermined amount of light from diode 46 to fix the conduction of transistor 48 and therefore, that of transistor 44 to maintain beam 35 in the reference position.

As a crucible or other object is positioned on balance pan 22, the weight which has a downward component as seen by the arrow in the figure, tends to rotate the balance beam 35 in a clock wise direction. The feedback loop, however, increases the current through winding 42 which increases the torque on armature 39 in a direction seen by the arrow in the figure to return the balance beam to its reference position. In so doing, the current through transistor 44 is increased an amount sufficient to provide the necessary recovery torque. The current in transistor 44 develops a voltage $V_s$ in the waveform diagram across the emitter resistor 45. Voltage $V_s$ is representative of and linearly related to the weight of objects positioned on the balance pan. The torque motor is commercially available as are the components of the feedback loop which is of conventional design. Signal $V_s$ is a generally DC voltage having a level which increases as weight is added to the balance pan. This signal voltage is compared with a time varying repetitive ramp signal shown as $V_r$ in the waveform adjacent the comparator 60 and which is developed by the ramp generator 50 as follows.

Generator 50 comprises an amplifier 52 with an integrating capacitor 54 coupled between input and output terminals of the amplifier. A variable calibration resistor 55 has one end coupled to the regulated $+V_1$ supply voltage and its adjustable arm coupled to the input of amplifier 52. For calibration, one of the calibrating weights can be positioned on the balance pan 22 and resistor 55 adjusted for an output reading on display 30 corresponding to the calibration weight. An FET switch 56 is coupled in parallel across capacitor 54 and is selectively closed by a repetitive constant frequency (100 Hz) signal 58 from terminal B of the signal control circuit 110.

As seen by the waveform diagram, at time $t_1$ the FET switch is closed for approximately 500 μs until time $t_0$. At this time, the ramp voltage is at a positive value of approximately 3 V in the preferred embodiment and once switch 56 is opened at time $t_0$, amplifier 52 provides a linear current applied to capacitor 54 to decrease the voltage at output terminal 53 of the generator. Signal $V_r$ is applied to comparator 60 via terminal 61 while signal $V_s$ is applied to terminal 65 of the comparator.

At the time of coincidence ($t_c$) of the ramp voltage $V_r$ with the signal voltage $V_s$, the comparator will switch from a conductive condition to a non-conductive condition thereby providing a positive going output waveform 65 at output terminal 62 of the comparator. Terminal 62 is coupled to the $+V_2$ supply by means of a resistor 63 such that the variable pulse width signal is a positive pulse as seen in the waveform 65 and is applied to the signal control circuit 110 via terminal A. The signal 65 shown represents a weight of approximately 10 mg which is within the 0–25 range of the balance of the preferred embodiment.

It is noted here that the time period from $t_1$ to the succeeding $t_1$ is the sampling interval and is approximately 10 msec. A dead band of 500 μs between time $t_1$ and $t_0$ exists and provides a reset interval for the remaining circuitry as described below. If a heavier weight is placed on the scale, the amplitude of $V_s$ increases since a greater torque recovery current is necessary to maintain the balance beam at its reference position and the comparison time $t_c$ takes place sooner along the negative slope of ramp voltage $V_r$. Thus, the waveform 65 will have a greater positive component. On the other hand, if a lighter weight is placed on the balance, the comparison time $t_c$ will take place more toward the end of the sampling interval and provide a narrower pulse width output from the comparator. As noted earlier, the sampling interval is repeated every 10 msec by discharging the capacitor 54 in a controlled fashion by means of pulses 58 developed by the signal control circuit now discussed.

Figure 3:
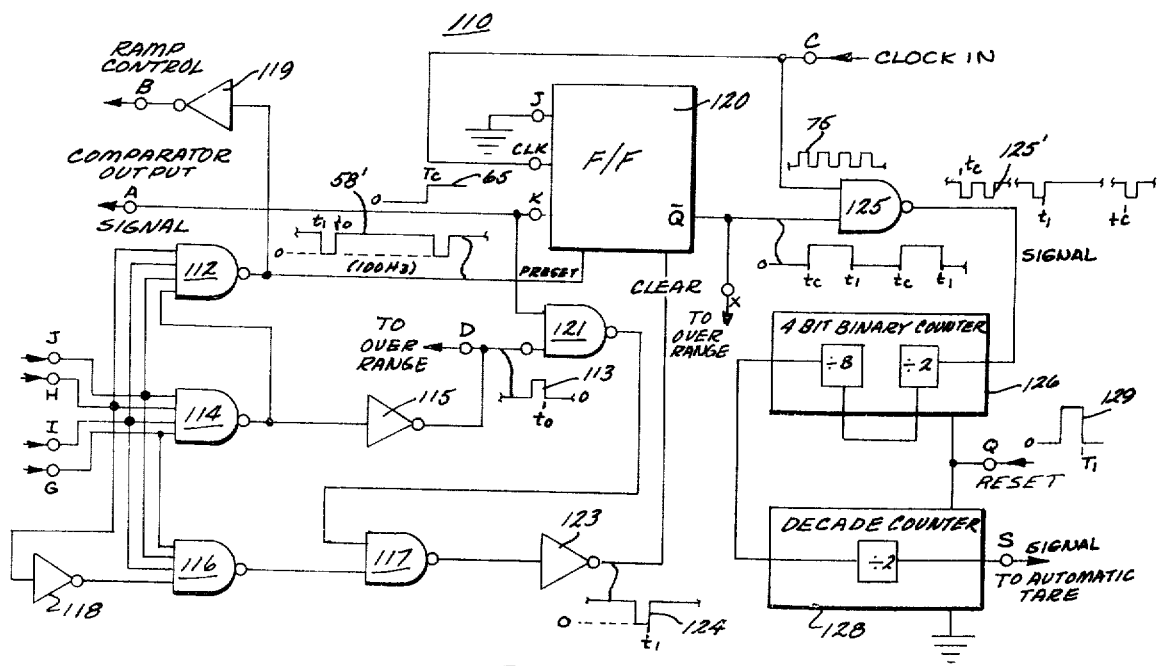
FIG. 3 is a detailed electrical circuit diagram in block form of the signal control circuit shown in FIG. 2 and includes waveform diagrams of signals at various circuit locations.

Referring specifically now to FIG. 3, it is seen that the signal control circuit 110 includes NAND gates 112, 114, 116 and NOT circuit 118 coupled to frequency divider circuit 80 by means of interconnected terminals G, H, I and J. The output of NAND gate 112 is coupled to a NOT circuit 119 which provides the 100 Hz control pulses 58 at output terminal B and shown in FIG. 2. Signals 58' shown in FIG. 3 are also applied to the preset input of a flip flop circuit 120. The comparator output signal 65 is applied to the K input terminal of flip flop 120 while the J input terminal is grounded.

The output of NAND circuit 114 is coupled to NOT circuit 115 having its output terminal coupled to a terminal D and to an inverting input of NAND gate 121. The output of NAND gate 121 is coupled to one of the input terminals of NAND gate 117 having the remaining input terminal coupled to the output of NAND gate 116. The output of NAND gate 117 is coupled to NOT circuit 123 having its output terminal coupled to the clear input of flip flop 120. The signals at the output terminal of circuit 123 are shown at 124 and comprise 100 Hz negative going pulses having positive going trailing edges occurring at time $t_1$.

The 2 MHz clock pulses 75 from the crystal controlled oscillator 70 are applied to the clock input terminal of flip flop 120 as well as to one input terminal of a NAND gate 125. The output signals from circuit 120 are positive going signals which appear on the $\overline{Q}$ output which goes to a 1 state when the K terminal goes to a 1 state at time $t_c$ of each sampling interval and upon receiving the next clock pulse from terminal C. Thus, the output signals applied to terminal X and to the remaining input of gate 125 comprise a plurality of positive pulses extending from $t_c$ and $t_1$ and having a frequency of 100 Hz.

The signals 125' on the output terminal of gate 125 are negative going bursts of 2 MHz pulses having a burst width corresponding to the time interval $t_c$ to $t_1$ and a burst frequency of 100 cycles per second. These signals are applied to a first counter circuit 126 which divides the signals by 16 and a second counter circuit 128 which further divides the pulses by 2 such that the output signals 105 (FIG. 2) at terminal S are third frequency (61.25 KHz) signals.

Counters 126 and 128 are reset at the display frequency rate (5 Hz) by means of reset pulses 129 applied to terminal Q of the signal and control circuit 110 from the read and reset generator 130. It is seen that the reset pulses are positive going signals having a negative going trailing edge occurring at a time instant $T_1$. It is noted that $T_1$ occurs at a time instant within the dead band region ($t_1$ to $t_0$) of a sampling interval.

Thus, it is seen that the signal control circuit serves to provide 61.25 KHz output signals 105 which represents an integration of 20 bursts of 2 MHz signals where each burst of signals includes a number of pulses representing the weight of an object. This integration greatly increases the accuracy of the scale and practically eliminates any random errors which may occur during each sampling interval by providing several cycles of sampling before a display output signal is provided.

The nature of the signals 105 from terminal S is seen in FIG. 2. They comprise positive going pulses starting at a time $T_c$ and ending at $T_1$ which falls within the 0.2 second time period of each display interval. It is noted here that time $T_c$ will roughly correspond in real time to the instant of time $t_c$ which corresponds to the leading edge of the first comparator output signal sample during a display interval. When a heavier object is positioned on the balance beam, a greater number of clock pulses will be in each burst applied to the counters 126 and 128 via gate 125 thereby providing a greater number of the signal output pulses 111 and shifting $T_c$ to the left.

The development of the read and reset signals employed for controlling the signal control circuit to in turn provide a signal 113 to the over range circuit 210 via terminal D as well as the ramp control signals 58 is described with reference to FIG. 4.

Figure 4:
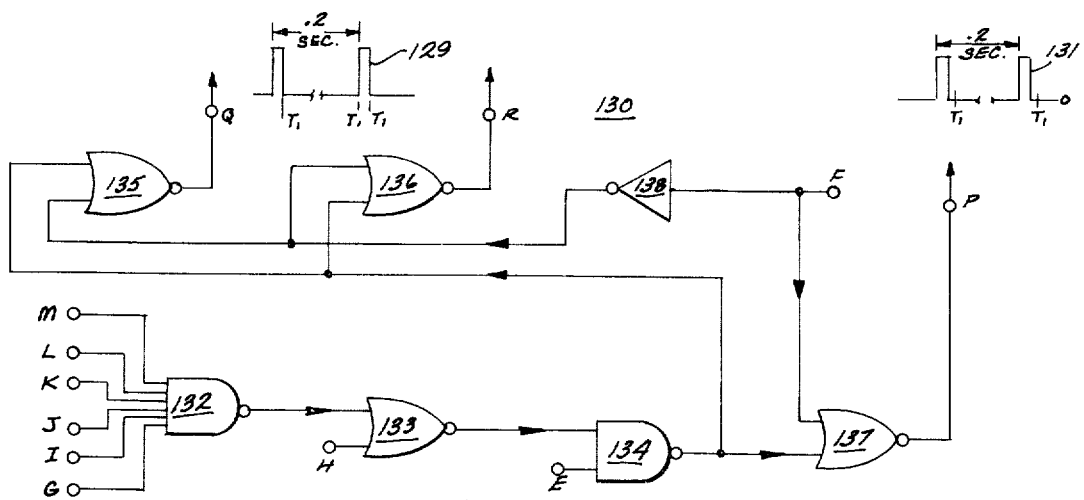
FIG. 4 is a detailed electrical circuit diagram in block form of the read and reset generator shown in FIG. 2 and includes waveform diagrams of signals at the output terminals of the circuit.
Figure 5:
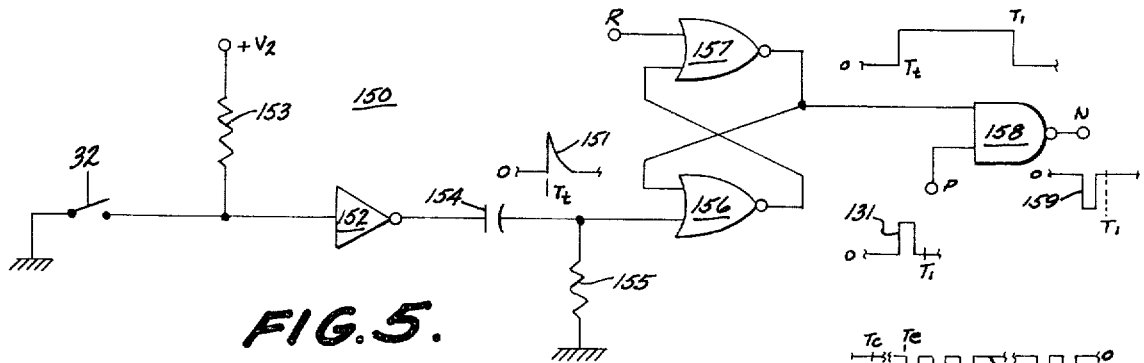
FIG. 5 is a detailed electrical circuit diagram in block form of the tare control circuit shown in FIG. 2 and includes waveform diagrams of signals at various circuit locations.

The read and reset circuit 130 as seen in FIG. 4 comprises a NAND gate 132 having a plurality of input terminals coupled to terminals G, I, J, K, L and M of the frequency divider 80. The output of NAND gate 152 is coupled to one input of NOR gate 133 having another input control to terminal H of the frequency divider. The output of gate 133 is coupled to one input terminal of NAND gate 134 having its remaining input terminal coupled to terminal E of the frequency divider circuit. The output of NAND gate 134 is coupled to a pair of NOR gates 135 and 136 and to an input of a NOR gate 137. Another input terminal of NOR gate 137 is coupled to terminal F of the counter frequency divider circuit 80 and to a NOT circuit 138. The output of NOT circuit 138 is coupled to the remaining input terminals of NOR gates 135 and 136.

As seen in the figure, the output terminals Q of gate 135 and R of gate 136 provide identical reset pulses 129 occuring at 5 Hz. The signal output at the output terminal of gate 137 comprises read pulses 131 which occur slightly before time $T_1$ (approximately 50 μs) and appear on output terminal P. Thus, the read and reset generator 130 receives various timing signals from the frequency divider circuit and provides timing signals defining the display frequency of 5 Hz and provides read and reset pulses for other circuits including the tare control circuit 150 now discussed.

The tare control circuit 150 operates to provide an output pulse during a display interval only when the manual tare switch 32 is actuated by the operator of the balance. Switch 32 has one terminal coupled to chassis ground and the other terminal coupled to the junction of NOT circuit 152 and resistor 153. Resistor 153 is in turn coupled to the $+V_2$ supply. The output of NOT circuit 152 is coupled to a differentiator circuit comprising capacitor 154 and resistor 155. The junction of capacitor 154 and resistor 155 is coupled to one input terminal of NOR gate 156 having an output terminal coupled to an input terminal of NOR gate 157. Reset pulses are applied to the remaining input terminal of gate 157 via terminal R. Gate 157 has its output terminal coupled to the remaining input terminal of gate 156 and to one input terminal of NAND gate 158. Read pulses from terminal P are applied to the remaining input terminal of NAND gate 158.

Typically, an operator will place a crucible on the balance pan. The balance will then display the weight of the crucible until the operator actuates the tare switch 32. This causes storage of the tare weight and only the weight of samples placed in the crucible will be displayed. Thus, it is seen that the tare switch is actuated at any random time (this time being identified as $T_t$). When actuated, a differentiated pulse 151 will appear at the junction of capacitor 154 and resistor 155 and cause the output of gate 157 to go positive from that time until the next reset pulse time $T_1$. During this time interval, a read pulse 131 from terminal P will also be applied to NAND gate 158 to provide a negative going tare read signal 159 shown adjacent terminal N of the tare control circuit. Pulse 158 will occur only once when the manually actuated tare switch 32 is closed.

Figure 6:
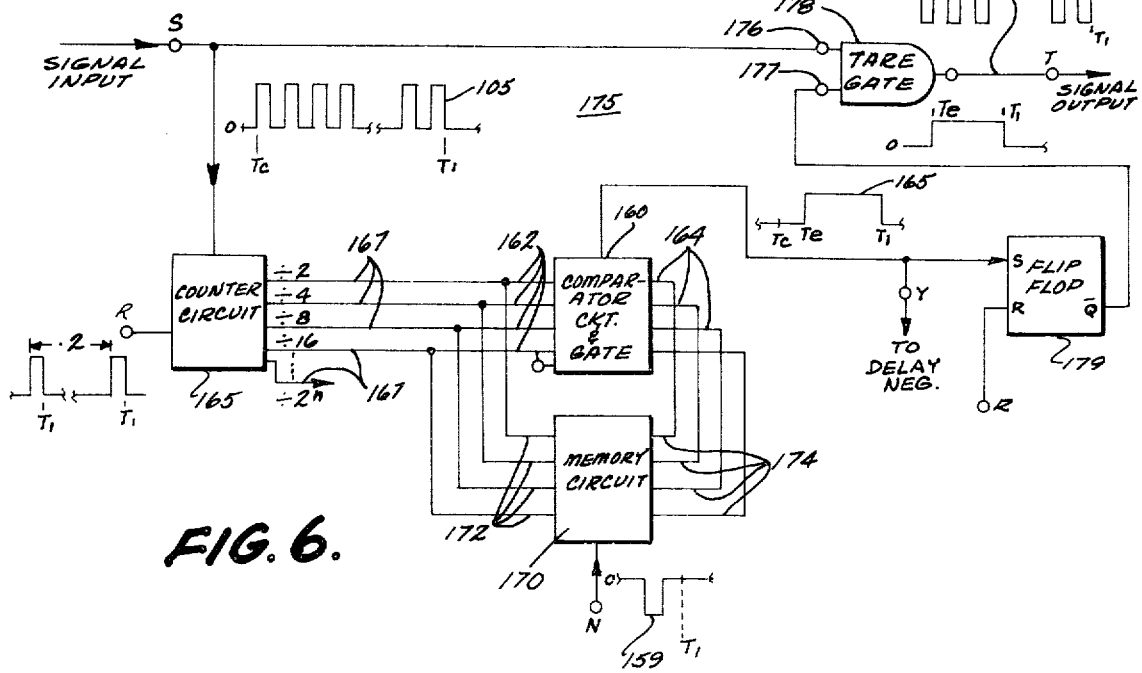
FIG. 6 is a detailed circuit diagram in block form of the auto-tare circuit shown in FIG. 2 and includes waveform diagrams of signals at various circuit locations.

The automatic tare circuit 175 as seen in FIG. 6 receives signal pulses 105 from terminal S and applies them to an input terminal 176 of tare gate 178. Gate 178 is enabled by signals applied to input terminal 177 to couple signal pulses 105 to the count and latch circuit 200 (FIG. 2) by means of terminal T.

The means for selectively activating the tare gate 178 such that the tare weight of the crucible is automatically compensated for comprises a comparator and gate circuit 160 having a plurality of input terminals 162 for receiving output pulses from a counter circuit 165 coupled to terminal S to receive pulses 105. Counter 165 is periodically reset at the display frequency by reset pulses from terminal R. Comparator 160 additionally includes a plurality of input terminals 164 coupled to a plurality of output terminals 174 of a memory circuit 170. The input terminals 172 of the memory circuit 170 are also coupled to the counter output terminals 167 to receive signals therefrom.

As an empty crucible is first positioned on the balance, the tare switch 32 is manually actuated generating a tare pulse 159 applied to the memory circuit 170 by means of terminal N. At this time, a predetermined number of pulses 105 have been counted and the output 167 of the counter circuit 165 provides signals indicating the total number of pulses and, therefore, the tare weight of the crucible. Pulse 159 actuates the memory circuit to provide at its output terminals 174 a continuous signal corresponding to this count and is continuously applied to the comparator input terminals 164 once the tare switch 32 has been activated and until the next activation of such switch.

When a sample 25 is positioned in the crucible, the number of pulses 105 will increase thereby changing the output of counter 165 and the input to the comparator circuit 160 at terminals 164. Comparator 160 includes a gate circuit which provides an enable signal 165' which occurs during the display interval at a time $T_e$ when the stored count in the memory circuit 170 (representative of the tare weight) equals the present count on input terminals 162. It is noted here that circuit 160 includes several four-bit comparator circuits having their control output terminals coupled to a NAND gate included in block 160 but not shown such that only when all of the four-bit comparators indicate a comparison exists, will the pulse 165' be initiated at time $T_e$. Memory circuit 170 likewise includes a plurality of storage circuits sufficient for storing the count from counter circuit 165. The output signal from comparator 160 comprises an enable pulse 165' shown in FIG. 6 and having a pulse width corresponding to the sample weight which includes the interval $T_e$ to $I_t$ encompassing a number of pulses 105 in excess of the stored count.

Signal 165' is positive going during the interval $T_e$ to the reset time $T_1$ and is applied to the S input of flip flop 179 which has the $\overline{Q}$ coupled to input terminal 177 of the tare gate 178. Reset pulses 129 are applied to the reset input of circuit 179. Thus, once the crucible is positioned on the balance and the tare weight stored by actuating switch 32, the only pulses passed by tare gate 178 will be those which are in excess of the previously stored tare weight and which occur during the interval $T_e$ $T_1$. These pulses are then applied to the count and latch circuit 200 which drives the display circuit 220 to display only the sample weight. The count and latch circuit 200 which is coupled to terminal T of the auto-tare circuit 175 is of conventional design and receives the pulses from terminal T and provides drive signals for the light emitting diode circuit 220. Circuit 220 also is of conventional design and commercially available and directly interfaces with circuit 200.

It is noted that prior to the actuation of the tare switch 32, the time $T_e$ will coincide with time $T_c$ and the gross weight of the crucible and anything in the crucible at that time will be displayed. To provide the net weight of the sample only, it is only necessary to first position the crucible on the balance and actuate the tare switch to clear out the tare weight of the crucible. When this is done, the time $T_e$ will occur at time $I_1$ since coincidence will not be detected by circuit 160 until all of the pulses representing the weight of the crucible have been received during a display interval. When the sample is positioned in the crucible, time $T_e$ will precede $T_1$ as seen in FIG. 6. Since the balance is relatively fast acting, the weight will be displayed almost immediately on the display 30.

When the crucible is removed from the balance, it is seen that the stored tare weight remains in the memory circuit 170 and the number of signal pulses 105 will be less than the stored pulses. This condition tends to cause the count and latch circuit 200 to drive the display circuit 220 in a flashing mode indicating a negative or non-positive read-out. To prevent such a result, a delay negative detector circuit 180 is provided and is coupled to the read and reset generator via terminals P and R to receive read and reset pulses therefrom. Circuit 180 is also coupled to terminal M of the divider circuit to receive 2 Hz signals therefrom and to the Y terminal of the auto-tare circuit 175.

Circuit 180 includes a dual JK flip flop which receives read and reset pulses and signals 165' from the auto-tare circuit 175. The Q and $\overline{Q}$ outputs of the flip flops are normally in the low and high states respectively. Upon receipt of a pulse 165', however (indicating a tare weight in excess of the weight stored in memory circuit 170), the Q output signal goes high while the $\overline{Q}$ signal goes to zero. Once the flip flop changes states, it remains in this condition until the next display interval whereupon it is reset and again looks for a signal from the Y terminal of the auto-tare circuit.

The output of the flip flop is coupled to a divide-by-4 counter which receives 2 cycle per second signals from the frequency counters via pin M and is coupled to the Q and $\overline{Q}$ outputs of the flip flop. The frequency divider counts the 2 Hz signals and upon receiving four cycles of these signals, its divide-by-4 output will go to a high state unless a pulse 165' is detected. If the crucible has been removed, however, no such signal is generated and after approximately 2 seconds, the delay negative detector 180 will provide an output signal on conductors 182 and 184.

The signal on conductor 182 is applied to a blanking drive circuit 185 which in turn is coupled to display circuit 220 to blank out the display and prevent its flashing. The signal on conductor 184 actuates the negative sign 221 on display 220 indicating that a negative number is detected by the balance. To rezero the balance it is only necessary to actuate the manual tare switch 32 thereby erasing the stored weight in memory circuit 170 and entering a zero weight signal (in the event that no weight is positioned on the balance).

In addition to the delay negative detector an over range circuit 210 is provided for flashing an over range light 212 at approximately 10 Hz thereby indicating that the weight positioned on the balance is in excess of its specified upper limit for the range selected. The over range circuit comprises a comparator which receives a signal 113 from terminal D and 65 from terminal X of the signal control circuit 110. Signal 65 will, in the event that the weight positioned on the balance is in excess of the balance range, crowd into the dead band between $t_1$ and $t_0$ thereby providing an overlap of the pulses 113 and 65 just prior or at the time $t_0$. This coincidence of pulses is detected by the comparator in the over range circuit 210 which actuates a gate to apply 10 Hz drive signals to the bulb 212 thereby flashing the light and indicating an over range weight.

In addition to these functions of the balance, the count and latch circuit 200 provides a binary coded decimal (BCD) output which can be applied to an analyzer 240 by means of an interconnecting cable 245. Analyzer 240 is manually actuated to enter only the desired sample weight as it appears at the BCD output terminals of the count and latch circuit 200. The analyzer is of the type manufactured by the assignee of the present application and is commercially available.

It is understood that various modifications to the present balance can be made. For example, the range can be extended by modifying the sampling interval and/or the slope of the ramp voltage generated by the circuit 50. A multiple range balance can be manufactured by providing selectable calibration resistors 55, one provided for each range. In addition, decimal place circuitry can be provided for automatically controlling the decimal of the display output when several ranges are provided. Also, range indicating lights likewise can be provided. These and other modifications to the present invention, however, will fall within the spirit and scope of the present invention as defined by the appended claims.

The embodiments of the invention in which an exclusive property or privilege is claimed are defined as follows:

1. An electronic balance comprising:
    circuit means for providing a plurality of electrical pulses, the total number of which represents the weight of objects positioned on the balance;
    storage means coupled to said circuit means and selectively operated by a tare switch to store signals representing the unknown weight of an object positioned on the balance;
    comparator means coupled to said circuit means and to said storage means for comparing signals stored in said storage means and signals representing the weight of said object and an additional object positioned on the balance and for providing a control signal when the number of pulses from said circuit means exceeds the stored number of pulses thereby indicating that an additional object is positioned on the balance;
    negative weight detector means coupled to said circuit means and to said storage means for providing an output signal in the event signals from said circuit means are representative of a weight less than the stored weight signals;
    display means;
    blanking circuit means coupled to said display means and to said negative weight detector means and responsive to said output signals therefrom to blank said display means when the weight positioned on said balance is less than the weight represented by signals stored in said storage means; and
    selectively operated coupling means coupled to said circuit means, to said display means and to said comparator means and responsive to said control signal from said comparator means for applying the pulses from said circuit means representing the weight of the additional object to said means to actuate said display means to provide an indication of the weight of the additional object.

2. An electronic balance providing a read-out corresponding to the weight of an object positioned on said balance, said balance including means for displaying only the weight of objects additionally positioned on said balance comprising:
    circuit means for providing signals representing the total weight of objects positioned on said balance;
    storage means coupled to said circuit means for storing signals representing the weight of objects positioned on said balance;
    means for actuating said storage means to selectively store signals representing the unknown weight of one or more objects positioned on said balance;
    comparing means coupled to said circuit means and to said storage means for providing a control signal when signals therefrom correspond;
    negative weight detector means coupled to said circuit means and to said storage means for providing an output signal in the event signals from said circuit means are representative of a weight less than the stored weight signals;
    display means for providing a read-out of the weight of an object;
    blanking circuit means coupled to said display means and to said negative weight detector means and responsive to said output signals therefrom to blank said display means when the weight positioned on said balance is less than the weight represented by signals stored in said storage means; and coupling means having a control terminal coupled to said comparing means for selectively coupling said circuit means to said display means in the presence of a control signal from said comparing means whereby only signals representing the weight of an object in excess of stored unknown weight representative signals are applied to said display means.

3. The balance as defined in claim 2 wherein said negative weight detector means includes a delay circuit for delaying the generation of an output signal therefrom for a predetermined period of time after the weight positioned on said balance is reduced to less than the weight represented by signals stored in said storage means.

4. An electronic balance comprising:

means for generating electrical signals representing the weight of an object positioned on the balance;

storage means selectively operated to store signals representative of the weight of an object;

comparator means coupled to said generating means and to said storage means for providing a control signal when the weight of an object equals or exceeds the stored weight of an object as represented by signals stored in said storage means;

display means selectively coupled to said generating means for providing a display of the weight of an object positioned on the balance;

detector means coupled to said comparator means for detecting the presence or absence of a control signal from said comparator means over a repetitive predetermined time interval; and inhibiting means coupled to said detector and to said display means for inhibiting the actuation of said display means in the event that a control signal is not detected during one of said predetermined time intervals.

5. The balance as defined in claim 4 and further including an overrange detector including indicating means, said overrange detector coupled to said generating means for providing an indication when the weight of an object positioned on said balance exceeds the upper weight limit measurable by said balance.

* * * * *